Feb. 14, 1961 L. BARLOW 2,971,272
ANATOMICAL MODEL
Filed Jan. 29, 1957 4 Sheets-Sheet 1
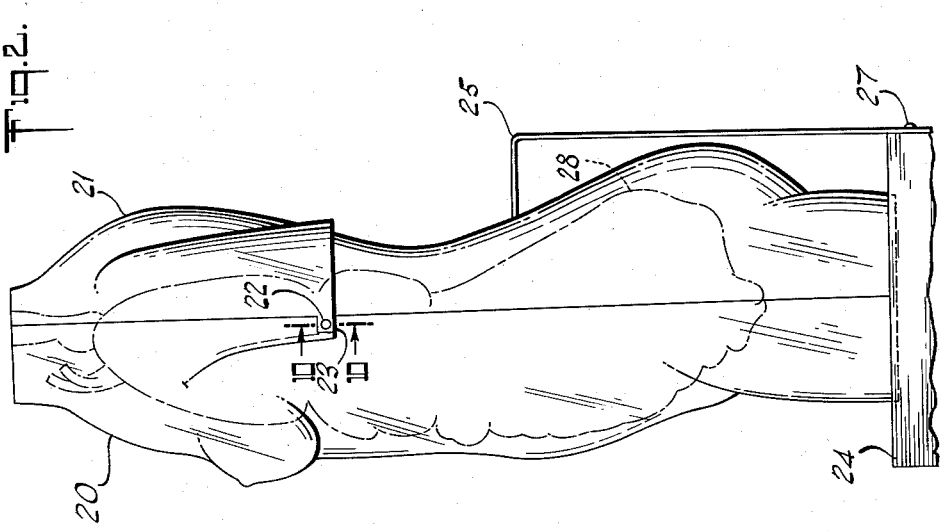
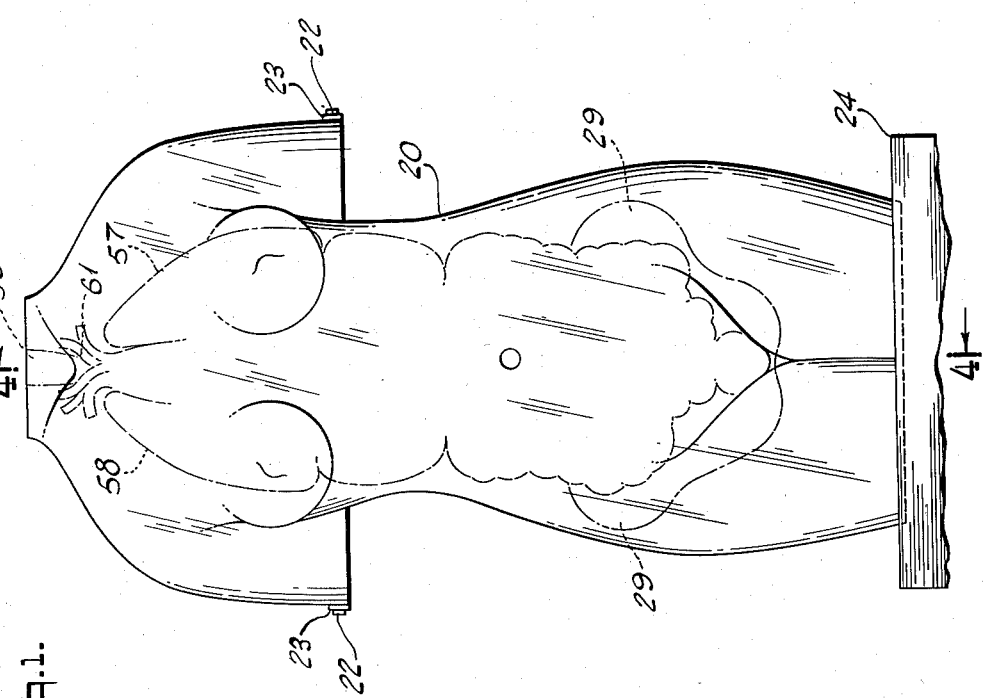
INVENTOR
LOU BARLOW
BY Stanley Walder
ATTORNEY Feb. 14, 1961 L. BARLOW 2,971,272
ANATOMICAL MODEL
Filed Jan. 29, 1957 4 Sheets-Sheet 2

INVENTOR
LOU BARLOW
BY Stanley Molder
ATTORNEY

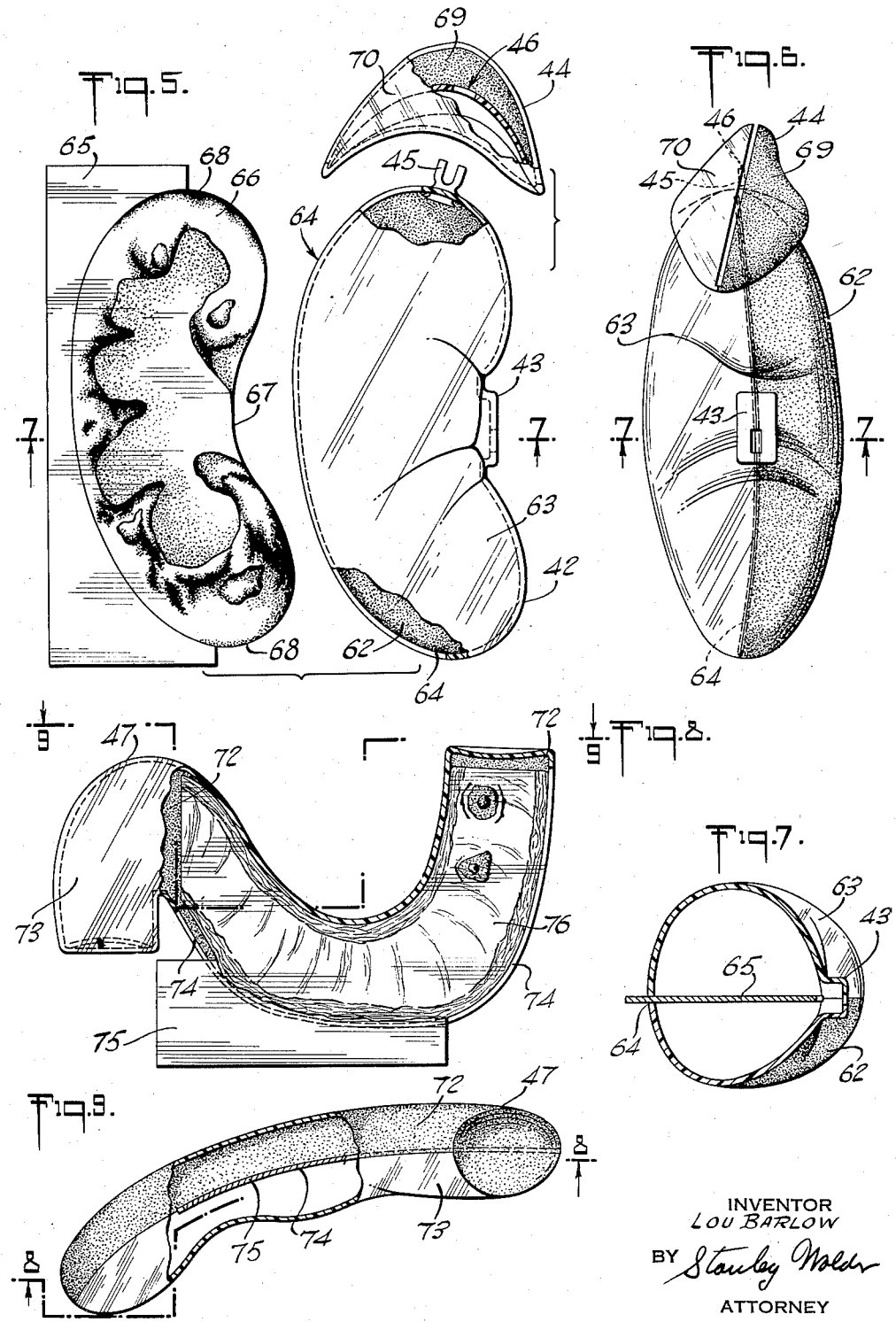

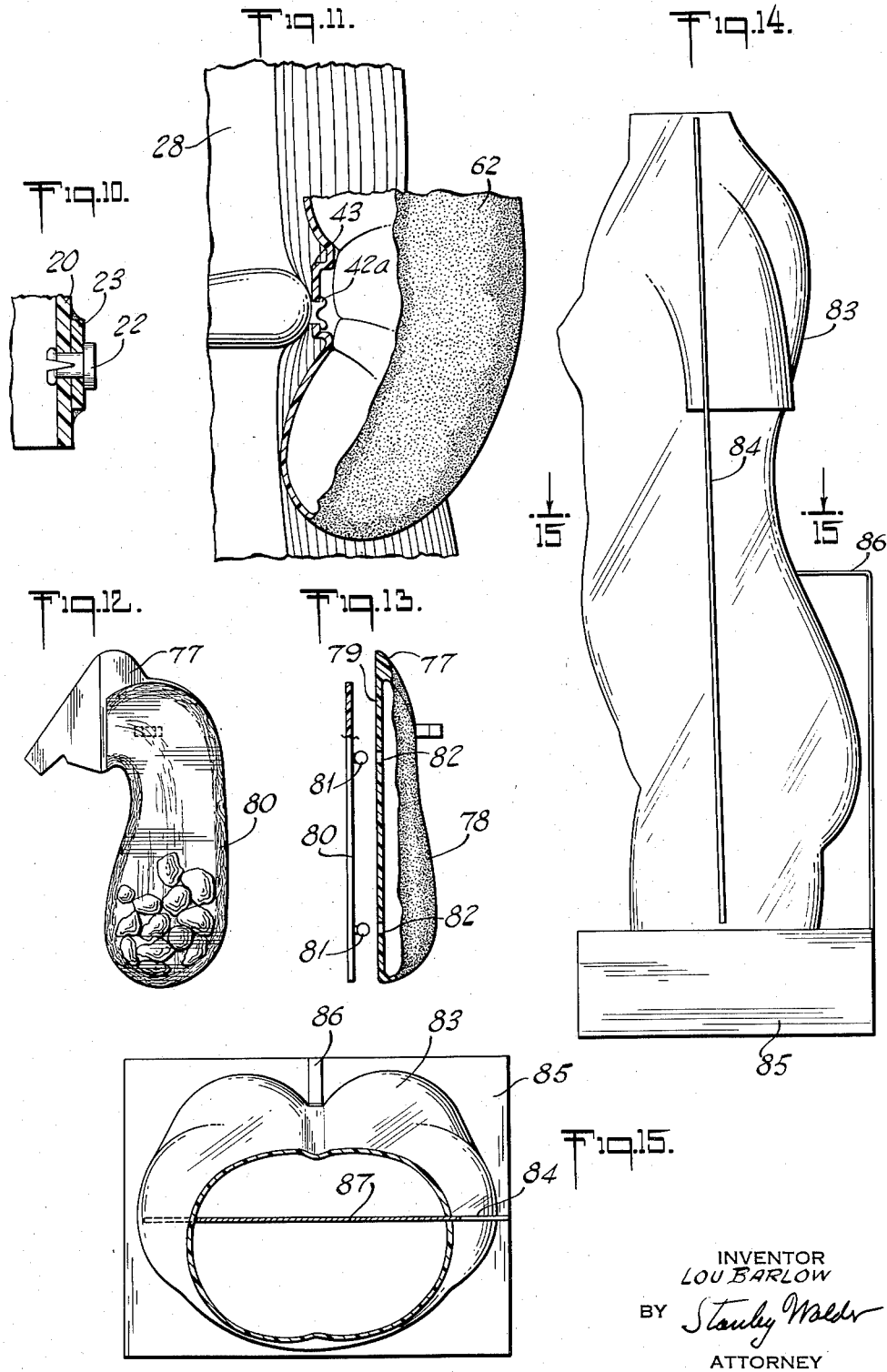

United States Patent Office 2,971,272
Patented Feb. 14, 1961

2,971,272
ANATOMICAL MODEL
Lou Barlow, New York, N.Y., assignor to William Douglas McAdams, Inc., New York, N.Y., a corporation of New York Filed Jan. 29, 1957, Ser. No. 636,918
17 Claims. (Cl. 35—17)

The present invention relates to an anatomical model and more particularly to one from which various states of the normal and abnormal gross and internal appearance of the human body or other life form portrayed may be studied.

From time to time in the past various means have been employed to portray the gross and internal structure of various life forms to be studied for biological, medical and other purposes. Usually the more detailed models consisted of either painted figures or figures which were in part or in whole broken away, and which contained in partial or full relief the internal organs to be studied. In such cases the organs were sometimes painted to display anatomical features of interest.

It is a primary object of the present invention to provide an anatomical model for life forms which will enable the study of gross and sectional features of both the whole life form and portions and organs thereof.

Another important object thereof is the provision of such a model which will enable the study of normal and abnormal or diseased states of the gross and sectional features of life forms and portions and organs thereof.

Still another object of the said invention is the provision of an anatomical model in which anatomical features such as body walls, separate organs and groups of organs and portions thereof are detachably secured in association with one another so that the individual features may be studied apart from the balance of such features.

The above and other objects are achieved in the preferred form by the provision of a hollow body or casing, the outer surface of which conforms to the configuration of the human body, there being detachably secured within the same simulated organs in the form of hollow plastic members each in the form of a body organ and disposed in accordance with the placement of the corresponding organs within the human body. Each of the said organs are detachably secured therein as by spring rivets or the like. The front walls of said organs may be tinted a distinctive color so that the organs contrast with one another when viewed through the front wall of the figure. Each of the organs may also bear an elongated slot into which may be inserted a lithographed card or the like which may bear thereon a representation of the gross or surface appearance of the organ or which may bear a sectional view thereof, either in the normal condition or in a diseased condition. The body or casing may consist of two or more sections which may be detachably secured to one another so as to permit ready access to the internal organs.

Other objects and a fuller understanding of the present invention may be had by referring to the following expanded description and claims taken in conjunction with the accompanying drawings which illustrate preferred embodiments thereof, it being understood that the foregoing statement of the objects of the subject invention and the brief summary thereof are intended to generally explain the same without limiting it in any manner.

Fig. 1 is a front view of an anatomical model embodying the present invention in the form of a human torso, the internal organs being indicated only in part.

Fig. 2 is a side elevation thereof.

Fig. 3 is a front elevation thereof, with the front panel removed.

Fig. 4 is a sectional view taken along line 4—4 of Fig. 1, and in conjunction therewith a removed front section shown in dot-dash outline.

Fig. 5 is a view of a model left kidney and adrenal gland in exploded relationship, with portions broken away to show the internal construction together with a related card for insertion in the model of the kidney.

Fig. 6 is a side view of said model kidney and adrenal gland.

Fig. 7 is a cross-sectional view of said model kidney taken along line 7—7 of Figs. 5 and 6, showing a card inserted therein.

Fig. 8 is a side elevation of a model duodenum with portions broken away and showing a card inserted therein.

Fig. 9 is a plan view partially in section taken along line 9—9 of Fig. 8.

Fig. 10 is an enlarged fragmentary sectional view taken along line 10—10 of Fig. 2.

Fig. 11 is an enlarged fragmentary view in elevation of a model kidney shown attached to a support member.

Fig. 12 is a view of another embodiment of the present invention, in which the information card is shown lying over the rear portion of a sectioned model gall bladder.

Fig. 13 is a side elevation thereof partly in section, portions being broken away.

Fig. 14 is a side elevation of still another embodiment of the present invention, in which a single lateral slot is formed in the side of the model torso.

Fig. 15 is a sectional view thereof taken along line 15—15 of Fig. 14.

A preferred embodiment of the present invention which is illustrated in Figs. 1 through 11 includes a hollow model human torso in the form of a body or casing of transparent, preferably plastic material, the same consisting of front and rear sections 20 and 21, respectively, said sections being pinned together by means of spring rivets 22 (see Fig. 10), rear section 21 having an apertured forwardly extending tab 23 on each side, the apertures being aligned with corresponding apertures in front of section 20, spring rivets 22 passing through said apertures and thus detachably securing said sections. The bottom edges of said sections 20 and 21 of said body lie within a recessed portion of a base 24 which corresponds in outline to the outline of the torso. Said torso is secured to base 24 by means of a bracket 25 (see Fig. 4) which is affixed at one end by screws 26 to rear section 21 and at the other end by screw 27 to base 24. A support member 28 occupies a major portion of the rear of the abdominal portion of said torso, having winged lateral extensions 29 corresponding to the pelvis, forward extensions 30 thereof simulating a pelvic bone structure. A brace member 31 extends between support member 28 and rear section 21. As shown support member 28 is hollow. Various model organs may be detachably secured to support member 28. Thus, as shown best in Fig. 4, model stomach 32 is affixed by means of a spring rivet 33 to said support member, the same passing through an aperture therein. Similarly, model pancreas 34 is so affixed by means of spring rivet 35.

A model small intestine 36, about which is affixed a simulated large intestine 37 by means of spring rivet 38, is affixed to support member 28 by means of a rearwardly extending sleeve portion 39, which frictionally engages a cylindrical peg 40 which extends forwardly from support member 28. Right and left model kidneys 41 and 42 may be affixed to spring fastening elements 42a (see Fig. 11) projecting from support member 28, the apertures in nubs 43 (see Fig. 5) protruding from said kidneys being engaged by said hooks.

A model adrenal gland 44 may be detachably secured atop each model kidney by means of a captured spring rivet 45 which extends from said model kidney into an aperture 46 in model adrenal gland 44. In similar fashion, a model duodenum 47 is affixed to said support by a spring rivet (not shown).

An opening 48 may be provided through support member 28 just to the rear of forward extension 30 thereof, in which may be inserted a model uterus 49. The same may be detachably secured either by frictional engagement or by providing spring rivets or the like. Above support member 28 and stomach 32 there may be suspended across the cavity formed within front and rear sections 20 and 21 a shelf 50 which may be employed to simulate the diaphragm, which divides said cavity into abdominal and thoracic portions. The said shelf 50 may be secured at a plurality of places to rear section 21 by brackets 51. If desired, of course, the manner of affixation may be such that said shelf itself is detachable.

Just beneath said shelf 50 is a model liver 52, which may be secured by spring rivets (not shown) to said shelf. Affixed to the liver by spring rivets (not shown) is a model gall bladder 53. Similarly a model spleen 54 may be so affixed to model stomach 32. A model heart 55 may be detachably secured to the top of shelf 50 by spring rivet 56. Similarly, left and right model lungs 57 and 58 may be so affixed atop shelf 50 so as to lie somewhat about model heart 55. A model trachea 59, from whcih model bronchi 60 may extend into model lungs 57 and 58 through apertures in the medial walls thereof, may be frictionally held in the position shown in the drawings. A model thyroid gland 61 is detachably secured as by spring rivets or the like (not shown) to model trachea 59.

All of the organs described may be tinted along their front faces so as to present a contrasting appearance when the user looks through front section 20. The relative positioning of the organs and their extent will thus be clearly apparent. There is provided in each of these organs an elongated slot into which there may be inserted a lithographed card or the like which bears either the surface appearance of the organ or the appearance of a section thereof. Since the rear walls of each such organ have not been tinted but remain of clear plastic the card may be viewed through said clear plastic and the appearance of the actual surface of the organ or a section thereof is thus simulated.

Examples of this structure are illustrated in Figs. 5 through 9. Thus left kidney 42 has a front tinted wall 62 and a rear clear wall 63. Along the left side thereof there is formed a slot 64 into which there may be inserted a portion of lithographed card 65, bearing thereon a portrayal 66 of a section of the kidney. The forward edge 67 of said card is made to conform in shape to the shape of the model kidney and the forward portions 68 thereof are likewise so formed. Portrayal 66 may be that of a section of a normal kidney or a section of any type of abnormal kidney. Information as to the nature of the section and, if it is desired, the nature of the disease, etc. may be printed upon the card not covered by portrayal 66. Of course, instead of portrayal 66 being that of a section of a kidney it might present the surface appearance of the kidney either in a diseased or normal condition.

Similarly, front wall 69 of model pancreas 44 is tinted and rear wall 70 thereof is left clear, while a slot 71 extends throughout most of the length of the organ to permit the insertion of a card similar to card 65.

Again, model duodenum 47 (see Fig. 8) has a tinted front wall 72 and a clear rear wall 73, there being an elongated slot 74 along adjoining portions of the two walls to enable the insertion of a card 75 which contains a portrayal 76 of a section of a duodenum. In Fig. 8 the card 75 is shown inserted in slot 74.

Instead of each model organ being truly a tridimensional model of the corresponding organ it may be a truncated model in which, as in the model gall bladder 77, shown in Figs. 12 and 13, the front tinted wall 78 thereof is in full relief while the rear wall 79 is planar. In such an instance a lithographed card 80 may be snapped on said rear wall 79 by means of the engagement of a plurality of buttons 81 which engage corresponding apertures 82 in said wall 79. In such event the front appearance of the anatomical model, when completely assembled, will remain substantially the same, the separate model organs being assembled in a manner similar to that employed with the first embodiment described.

Still another embodiment is shown in Figs. 14 and 15 wherein the entire figure or body 83 may be made unitary or assembled as a unit, and a lateral slot 84 extend substantially the length of the figure. The figure may be mounted upon a base 85 and supported by a bracket 86. Into slot 84 there may be inserted a lithographed card 87 or the like, bearing a portrayal of a section of the entire torso or the front and rear external or internal appearance thereof in a normal or abnormal condition.

Similarly, a portion of a life form less or greater than a torso or less or greater than the entire organism could be similarly treated.

Without departing from the spirit of the invention, various types of closure means may be employed in connection with the means of detachably connecting the model organs to the body. While spring rivets have been shown, it is obvious that frictionally secured rods engaging matching apertures or spring fasteners of a variety of types may be substituted. Also, in connection with the preferred embodiment shown in Figs. 1 through 11, the front and rear sections 20 and 21 thereof, instead of being pinned together by means of spring rivets 22, may be hinged to one another at one lateral extremity and closed by spring latch means at the other.

Thus, what has been described is a structure which when used with multiple card inserts enables the vivid demonstration of varied normal and diseased conditions of a specific organ, groups of organs or organisms. Embodiments of the invention may be used either as educational devices or to promote the sale of products.

Although the subject invention has been described with a certain degree of particularity, it is understood that the present disclosure has been made only by way of example and that numerous additions and changes in the details of construction, combination and arrangement may be resorted to without transcending the scope of the invention as hereinafter claimed.

What is claimed is:

1. An anatomical model comprising a hollow body in the shape of a life form, a plurality of hollow organ members secured to said body, each of said members having the surface configuration of an organ of said form and being positioned within said body in arrangements simulating the positions of corresponding organs of the living life form, at least a portion of a wall of each of said members being transparent, each of said members having an elongated opening therein, a plurality of information elements, each bearing anatomical features of said organs, inserted in said opening in each corresponding organ member and positioned within said member viewable through said portion.

2. A model as described in claim 1, said hollow body being transparent.

3. A model as described in claim 1, each of said organ members being detachably secured to said body.

4. A model as described in claim 1, said features comprising at least a part of the surface features of each of said organ members.

5. A model as described in claim 1, said features comprising a part of the features of said of each organ members in section.

6. A model as described in claim 1, the walls of each of said organ members being transparent.

7. An anatomical model as described in claim 6, the front walls of each of said organ members being distinctively colored so that said organ members present a contrasting appearance.

8. An anatomical model comprising a hollow transparent body in the shape of a human figure, a plurality of hollow organ members, at least a portion of a wall of said members being transparent, detachably secured to said body, each of said members having the surface configuration of a human organ, and being positioned within said body in arrangements simulating the positions of corresponding human organs, each of said members having an elongated opening therein, a plurality of information elements, each bearing anatomical features of said organs, inserted in said opening in each corresponding organ member and positioned within said member viewable through said portion.

9. A model as described in claim 8, said features comprising at least a part of the surface features of each of said organ members.

10. A model as described in claim 8, said features comprising a part of the features of each of said organ members in section.

11. An anatomical model comprising a hollow body in the shape of a truncated organ of a life form and a sheet bearing features of the truncated portion of said organ detachably secured thereto over said truncated portion.

12. An anatomical model comprising a hollow body in the shape of a life form, at least a portion of a wall of said body being transparent, said body having an elongated opening therein, an information element bearing anatomical features of said body inserted in said opening and positioned within said body viewable through said portion.

13. An anatomical model comprising a hollow transparent body in the shape of a life form, said body having a slot-like opening therein, a sheet bearing anatomical features of said body inserted in said opening, whereby said features are viewable through the transparent walls of said body.

14. An anatomical model comprising a hollow body in the shape of a life form, at least a portion of a wall of said body being transparent, said body having an elongated opening therein, an information element in the form of a sheet of material upon which there is portrayed subject matter selected from the surfaces and sections of said life form, in health and in disease, inserted in said opening and positioned within said body, viewable through said portion.

15. An anatomical model comprising a hollow transparent body in the shape of an organ of a life form, said body having a slotlike opening therein, an information element in the form of a sheet of material upon which there is portrayed subject matter selected from the surfaces and sections of said organ, in health and in disease, inserted in said opening and positioned within said body, viewable through said portion.

16. A display device comprising, in combination, a three-dimensional body substantially conforming in shape to at least a portion of a physical structure, said body being formed with at least one slot, and at least a portion of said body being transparent and bounding said slot at one side thereof; and at least one exchangeable slide means including a slide having an outline conforming to the outline of said body in the region of said slot, said slide being adapted to carry an image of at least a part of said portion of said physical structure, said slide means being removably mounted in said slot so that said part of said physical structure appears to be located within said three-dimensional transparent body when said image is viewed through said transparent portion.

17. An anatomical model comprising a hollow body in the shape of an organ of a life form, at least a portion of a wall of said body being transparent, said body having an elongated opening therein, an information element bearing anatomical features of said body inserted in said opening and positioned within said body viewable through said portion.

References Cited in the file of this patent

UNITED STATES PATENTS

| | | |
|---|---|---|
| 2,158,906 | Netter | May 16, 1939 |
| 2,678,505 | Munson | May 18, 1954 |

FOREIGN PATENTS

| | | |
|---|---|---|
| 756,342 | Great Britain | Sept. 5, 1956 |

OTHER REFERENCES

Pamphlet: "Juno," published by the Cleveland Health Museum (Healthguide No. 1), copyrighted 1952 (20 pages, including covers).

"Durolatex Models of Human Anatomy," Bulletin of the Chicago Apparatus Company, received Dec. 18, 1939, pages 2–5 relied on.